(12) United States Patent
Zhou et al.

(10) Patent No.: US 8,463,982 B2
(45) Date of Patent: Jun. 11, 2013

(54) METHOD OF STORING AND ACCESSING ERROR CORRECTING CODE IN NAND FLASH

(75) Inventors: Fang Zhou, Chengdu (CN); Zhengxian Zou, Chengdu (CN)

(73) Assignee: IPGoal Microelectronics (SiChuan) Co., Ltd., Chengdu, Sichuan Province (CN)

( * ) Notice: Subject to any disclaimer, the term of this patent is extended or adjusted under 35 U.S.C. 154(b) by 843 days.

(21) Appl. No.: 12/501,388

(22) Filed: Jul. 10, 2009

(65) Prior Publication Data

US 2010/0106894 A1   Apr. 29, 2010

(30) Foreign Application Priority Data

Oct. 29, 2008   (CN) .......................... 2008 1 0046403

(51) Int. Cl.
*G06F 12/00* (2006.01)

(52) U.S. Cl.
USPC ............ 711/103; 711/100; 711/154; 711/156

(58) Field of Classification Search
USPC .................................. 711/100, 103, 154, 156
See application file for complete search history.

(56) References Cited

U.S. PATENT DOCUMENTS

2010/0332952 A1* 12/2010 Chung ......................... 714/773

* cited by examiner

*Primary Examiner* — Midys Rojas

(57) ABSTRACT

A method of storing and accessing an error correcting code in NAND Flash, includes utilizing n pages of a block of the NAND Flash as an extended space of a spare area, $n \leq 1$, wherein when writing data, the data is stored in a data area of a sector, and when the error correcting code needs a space which has correcting capability larger than 16 bytes, first 16 bytes of the error correcting code is stored in the 16 bytes spare area, and the remaining of the error correcting code is stored in the extended space of the spare area corresponding to the sector. Therefore, the method develops new storing space for the error correcting code, arranges the error correcting code in sequence of data blocks in sub-space, and loads the error correcting code into system memory for the decoder before reading original data.

8 Claims, 4 Drawing Sheets

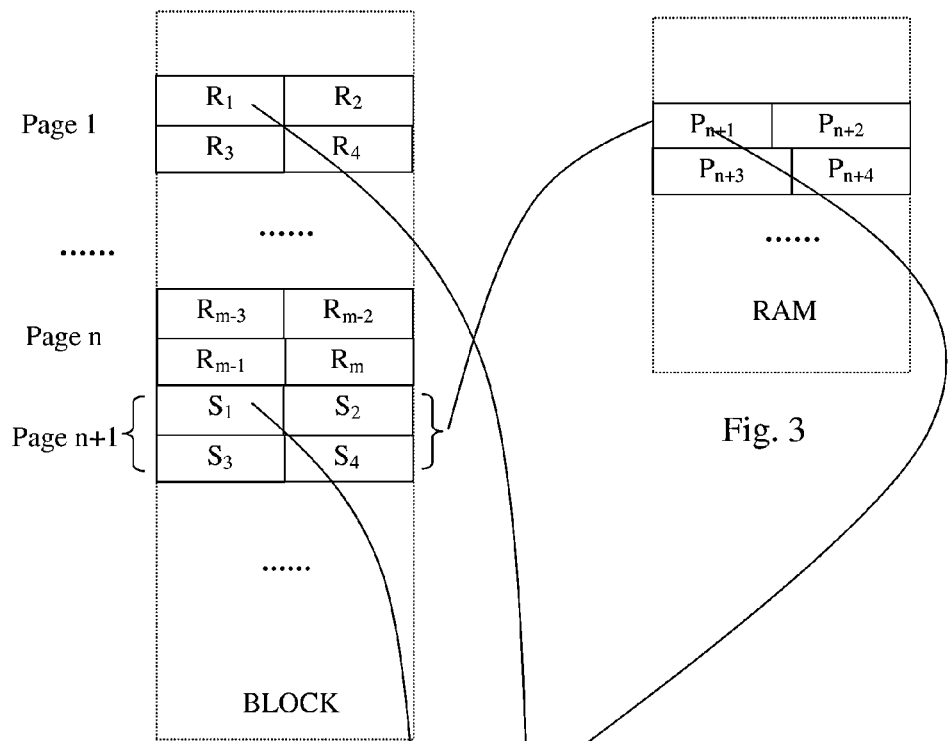
Fig. 2
Fig. 3
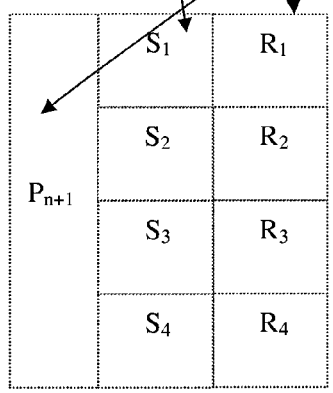
Fig. 4
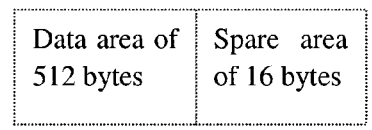
Fig. 5

METHOD OF STORING AND ACCESSING ERROR CORRECTING CODE IN NAND FLASH

BACKGROUND OF THE PRESENT INVENTION

1. Field of Invention

The present invention relates to NAND Flash, and more particularly to a method of storing and accessing error correcting code in NAND Flash.

2. Description of Related Arts

The NAND Flash is a storage medium for storing data. A NAND Flash consists of many blocks, and each block consists of a predetermined number of pages. Ordinarily, a page consists of a 2K bytes data area and a 64 bytes spare area, as shown in FIG. 1.

According to the data storage logic, each page is divided into 4 sectors, wherein each sector comprises a 512 bytes data area and a 16 bytes spare area. Electric charges of NAND Flash can maintain the status of transistors permanently. However, the electric charges are separated by oxide layers for maintaining in a stable status, and the oxide layers disappear as time goes by and are consumed by using. Finally, NAND Flash will lose function. Therefore, NAND Flash may have bad blocks during producing and using. A bad block means that one or more pages of the block have data storage errors when storing data. What's more, bad blocks have larger probability to occur as service life of NAND Flash increases. Great resource waste will be caused if simply abandoning the bad blocks when using NAND Flash.

To improve stability and efficiency of flash storage, a certain data correcting algorithm should be adopted. After being computed with the data correcting algorithm, a group of error correcting codes will be appended to the data which need to be stored. Therefore, the manufacturers of NAND Flash prepare a spare area for storing the error correcting code when designing NAND Flash memory array. For example, every 512 bytes data block is assigned a 16 bytes spare area.

Generally, encoding is processed by the sector, so the error correcting code can only be stored in a spare area which is maximum 16 bytes. The earlier technology of NAND Flash mainly adopts SLC (single-cell) technology, which has low probability of error for a single data block, and the spare area in the NAND Flash memory array is enough to store the error correcting code produced by the data correcting algorithm. However, the current technology of NAND Flash mainly adopts MLC (multi-level-cell) technology. Due to the increased density, the probability of error for a single data block increases, too. The correcting capability that a single data block needs is far larger than the requirement of the SLC technology. As a result, the 16 bytes spare area is not capable of storing all the error correcting code. A common solution to the problem mentioned above is to adopt a different correcting algorithm or reduce correcting capability. However, the solution is based on sacrificing correcting capability, and therefore can not meet the requirement of current MLC technology of NAND Flash.

SUMMARY OF THE PRESENT INVENTION

An object of the present invention is to provide a method of storing and accessing an error correcting code in NAND Flash, which utilizes a data area of a block of the NAND Flash as an extended space of a spare area to store more error correcting code, so as to greatly increase correcting capability.

Accordingly, the present invention provides a method of storing and accessing an error correcting code in NAND Flash, comprising:

utilizing n pages of a block of the NAND Flash as an extended space of a spare area, $n \geq 1$, wherein when writing data, the data is stored in a data area of a sector, and when the error correcting code needs a space which has correcting capability larger than 16 bytes, first 16 bytes of the error correcting code is stored in the 16 bytes spare area, and the remaining of the error correcting code is stored in the extended space of the spare area corresponding to the sector.

The n pages are divided into equal sections, and each section is utilized as the extended space of the spare area of each sector in other pages of the NAND Flash, wherein each section has a length equal to a difference between the error correcting code and 16 bytes.

The n pages of the block are from page 1 to page n, so that the extended space of the spare area is from page 1-$n$. The page 1-$n$ are divided into m equal sections, so that normal pages each including a data area and a spare area begin from page n+1. A first sector of the page n+1 is labeled $S_1$, and the extended space of the spare area corresponding to the first sector of the page n+1 is labeled $R_1$. When $R_1$ is the first section of page 1, the first section of page 1 is the extended space of the spare area corresponding to the first sector of the page n+1. When the n pages are pages other than the page 1-$n$, the correspondence can be derived from the above.

The NAND Flash addresses by logical address of the data area when writing data into the data area.

When the NAND Flash writes data into the data area of a block, an internal memory RAM reads a page number where the extended space locates, wherein the extended space is corresponding to the spare area of the sector When reading data, the NAND Flash must firstly read data in the data area, error correcting code in the spare area and error correcting code in the extended space corresponding to the spare area, and then decode with a decoder.

The NAND Flash reads data by steps of:

reading a page number $P_n$ from the RAM; and decoding 512 bytes data in the data area of each sector corresponding to the page number $P_n$, 16 bytes error correcting code in the spare area of each sector corresponding to the page number $P_n$, and error correcting code in the extended space $R_n$ corresponding to the spare area of the sector, so as to obtain the data stored.

The present invention has the following advantages:

developing new storing space for the error correcting code, arranging the error correcting code in sequence of data blocks in sub-space, and loading the error correcting code into system memory for the decoder before reading original data.

These and other objectives, features, and advantages of the present invention will become apparent from the following detailed description, the accompanying drawings, and the appended claims.

BRIEF DESCRIPTION OF THE DRAWINGS

FIG. 2 is a schematic view of arrangement of extended space in pages according to a first preferred embodiment of the present invention.

FIG. 3 is a schematic view of storing error correcting code into RAM according to the above preferred embodiment of the present invention.

FIG. 4 is a schematic view of correspondence between spare areas and extended spaces in pages according to the above preferred embodiment of the present invention.

FIG. 5 is a schematic view of structure of a sector of NAND Flash.

DETAILED DESCRIPTION OF THE PREFERRED EMBODIMENT

Embodiment 1

A method of storing and accessing an error correcting code in NAND Flash, comprising:

utilizing n pages of a block of the NAND Flash as an extended space of a spare area, n≧1, wherein when writing data, the data is stored in a data area of a sector, and when the error correcting code needs a space which has correcting capability larger than 16 bytes, first 16 bytes of the error correcting code is stored in the 16 bytes spare area, and the remaining of the error correcting code is stored in the extended space of the spare area corresponding to the sector.

The n pages are divided into equal sections, and each section is utilized as the extended space of the spare area of each sector in other pages of the NAND Flash, wherein each section has a length equal to a difference between the error correcting code and 16 bytes.

Referring to FIG. 2, the n pages of the block are from page 1 to page n, so that the extended space of the spare area is from page 1-n. The page 1-n are divided into m equal sections, so that normal pages each including a data area and a spare area begin from page n+1. A first sector of the page n+1 is labeled $S_1$, wherein $S_1$ consists of the data area and the spare area, as shown in FIG. 5, and the extended space of the spare area corresponding to the first sector of the page n+1 is labeled $R_1$. When $R_1$ is the first section of page 1, the first section of page 1 is the extended space of the spare area corresponding to the first sector of the page n+1. When the n pages are pages other than the page 1-n, the correspondence can be derived from the above.

Figure 1:
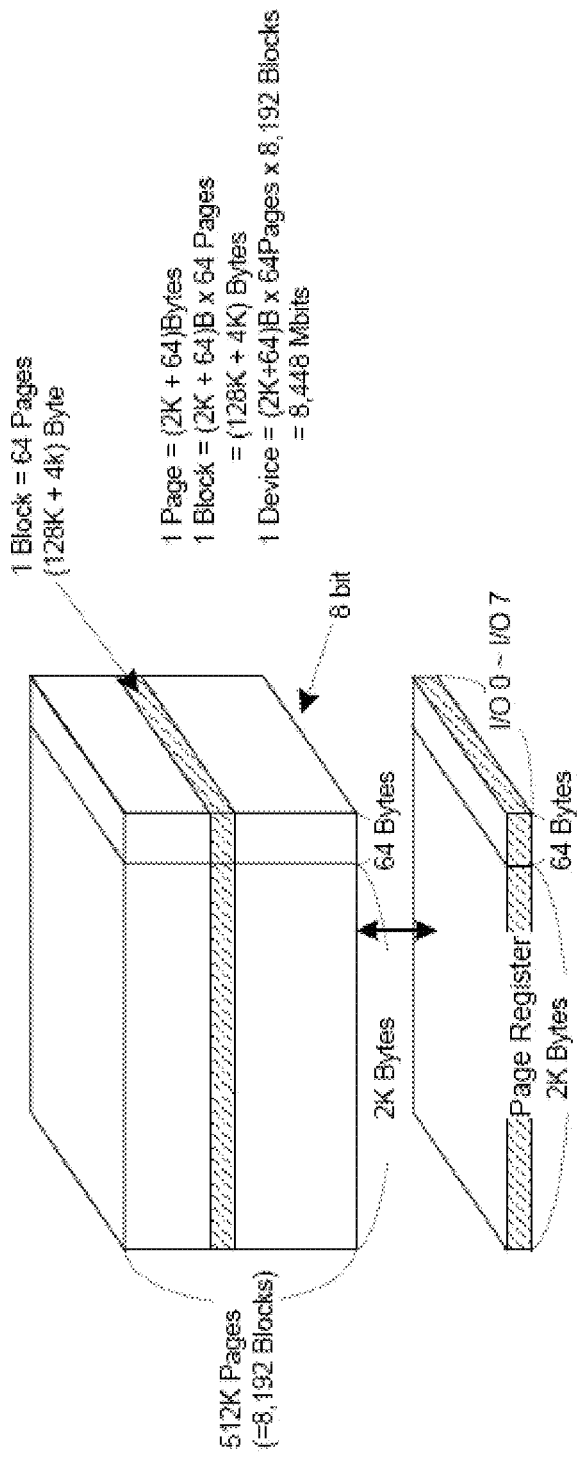
FIG. 1 is a schematic view of structure of NAND Flash.
Figure 6:
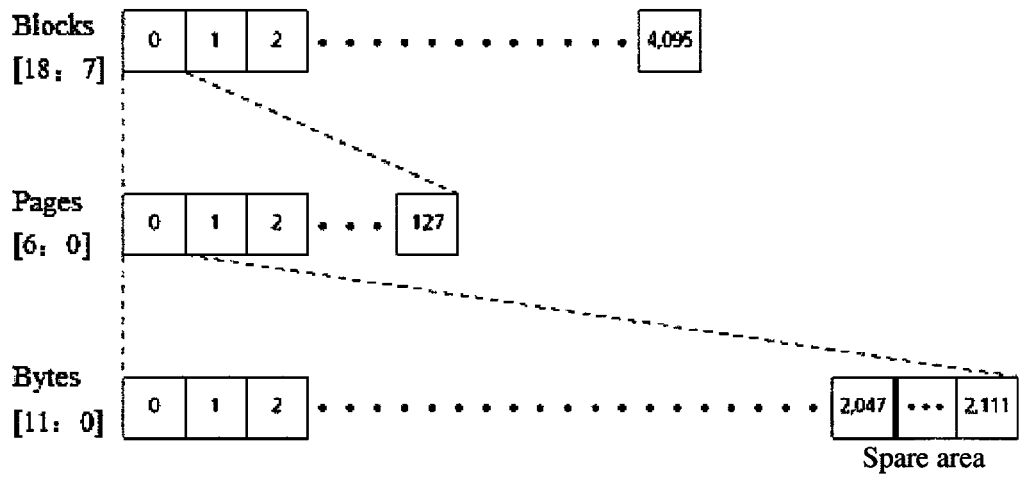
FIG. 6 is a schematic view of addressing by logical address of NAND Flash according to the above preferred embodiment of the present invention.

The NAND Flash addresses by logical address of the data area when writing data into the data area, as shown in FIG. 6.

Figure 7:
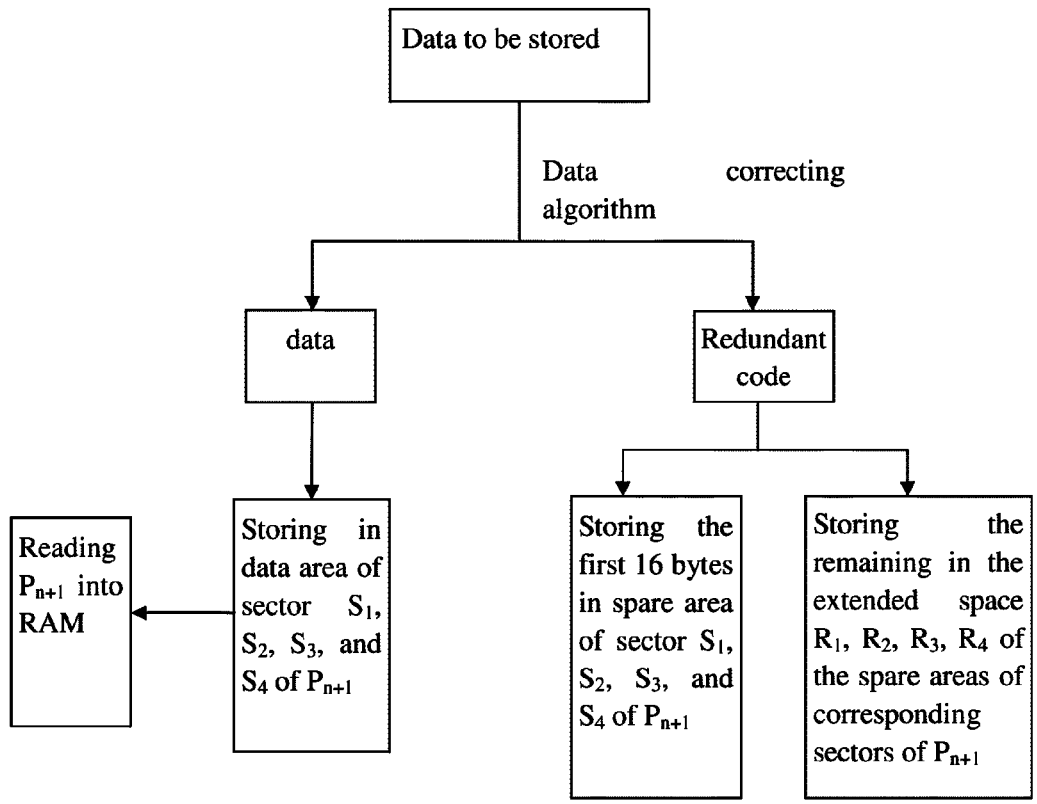
FIG. 7 is a flow chart of storing data according to the above preferred embodiment of the present invention.

Referring to FIG. 3 and FIG. 7, when the NAND Flash writes data into the data area of a block, an internal memory RAM reads a page number where the extended space locates, wherein the extended space is corresponding to the spare area of the sector.

Figure 8:
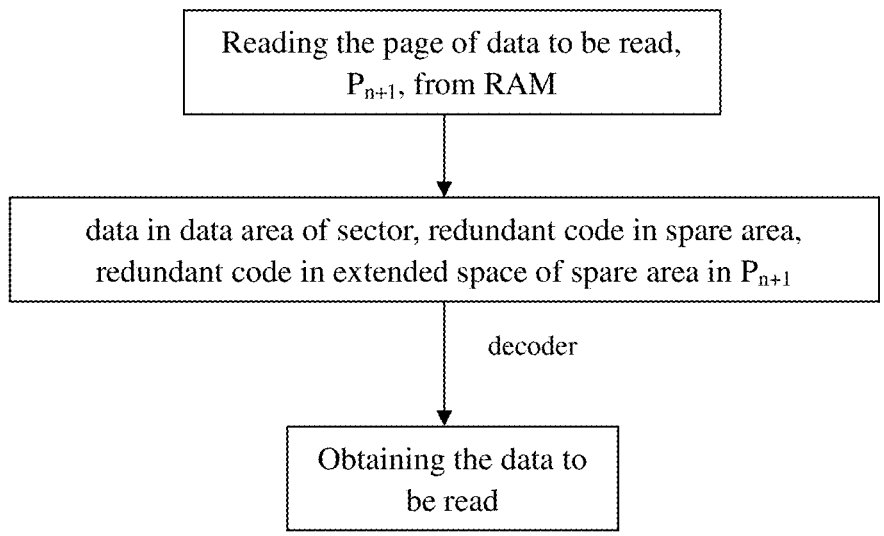
FIG. 8 is a flow chart of reading data according to the above preferred embodiment of the present invention.
Figure 9:
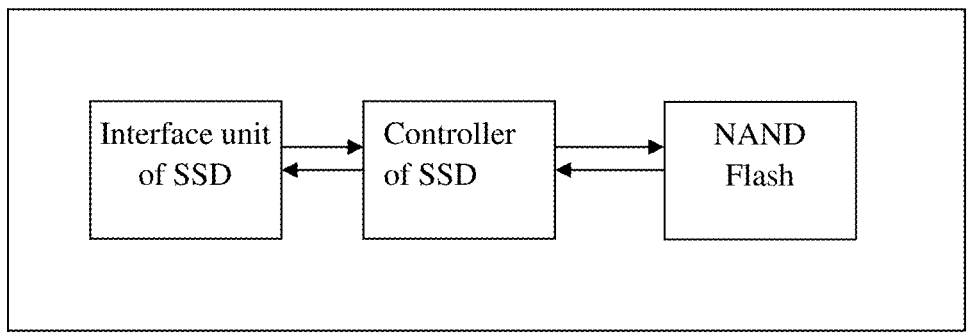
FIG. 9 is a schematic view of composing of a second preferred embodiment of the present invention.
Figure 10:
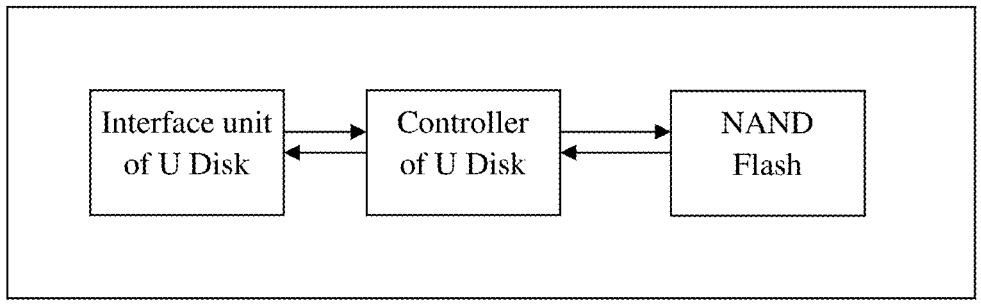
FIG. 10 is a schematic view of composing of a third preferred embodiment of the present invention.

Referring to FIG. 8, when reading data, the NAND Flash must firstly read data in the data area, error correcting code in the spare area and error correcting code in the extended space corresponding to the spare area, and then decode with a decoder.

The NAND Flash reads data by steps of:

reading a page number $P_n$ from the RAM; and decoding 512 bytes data in the data area of each sector corresponding to the page number $P_n$, 16 bytes error correcting code in the spare area of each sector corresponding to the page number $P_n$, and error correcting code in the extended space $R_n$ corresponding to the spare area of the sector, so as to obtain the data stored.

Referring to FIG. 4, taking $P_{+1}$ as an example. The NAND Flash reads data by steps of:

reading the page number $P_{n+1}$ from the RAM; and decoding the 512 bytes data in the data area of sectors $S_1$-$S_4$ corresponding to the page number $P_{n+1}$, the 16 bytes error correcting code in the spare area of sectors $S_1$-$S_4$ corresponding to the page number $P_{n+1}$, and the error correcting code in the extended space $R_1$-$R_4$ corresponding to the spare area of the sectors $S_1$-$S_4$, so as to obtain the data stored.

Embodiment 2

The method can be applied to a storage which uses NAND Flash as storage medium, so as to increase correcting capability of the storage.

A method of forming a solid state disk (SSD) with a NAND Flash which stores and accesses error correcting code according to the method provided by the present invention, a SSD controller, and a SSD interface unit, comprises the steps of:

utilizing one or more pages of a block in the NAND Flash of the SSD as the extended space of the spare area;

dividing the data area in the pages into equal sections, and utilizing each section as the extended space of the spare area of each sector in the pages; and reading a page number of the extended space of the spare area to be operated into an internal storage RAM.

When storing data, data is sent to the SSD controller via the SSD interface unit, the SSD controller sends the data and error correcting code to the NAND Flash by data correcting algorithm, and the data is stored in the data area. When the SSD has a correcting capability larger than 8 bit, 16 bytes of the error correcting code is stored in the spare area of the NAND Flash, and the remaining is stored in the extended space of the spare area.

When reading data, the data to be read in the data area, the error correcting code in the spare area and the error correcting code in the extended space corresponding to the spare area are transmitted to the SSD controller, and then the SSD controller restores the data by a decoder and transmits to the SSD interface unit.

Embodiment 3

A method of forming a USB flash disk (U Disk) with a NAND Flash which stores and accesses error correcting code according to the method provided by the present invention, a U Disk controller, and a U Disk interface unit, comprises the steps of:

utilizing one or more pages of a block in the NAND Flash of the U Disk as the extended space of the spare area;

dividing the data area in the pages into equal sections, and utilizing each section as the extended space of the spare area of each sector in the pages; and reading a page number of the extended space of the spare area to be operated into an internal storage RAM.

When storing data, data is sent to the U Disk controller via the U Disk interface unit, the U Disk controller sends the data and error correcting code to the NAND Flash by data correcting algorithm, and the data is stored in the data area. When the U Disk has a correcting capability larger than 8 bit, 16 bytes of the error correcting code is stored in the spare area of the NAND Flash, and the remaining is stored in the extended space of the spare area.

When reading data, the data to be read in the data area, the error correcting code in the spare area and the error correcting code in the extended space corresponding to the spare area are transmitted to the U Disk controller, and then the U Disk controller restores the data by a decoder and transmits to the U Disk interface unit.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method of storing and accessing an error correcting code in NAND Flash, comprising:
utilizing n pages of a block of the NAND Flash as an extended space for spare areas of sectors, $n \geq 1$, wherein when writing data, the data is stored in a data area of a sector, and when the error correcting code needs a space which has correcting capability larger than 16 bytes, first 16 bytes of the error correcting code is stored in the 16 bytes spare area of the sector, and remaining of the error correcting code is stored in the extended space for the spare area corresponding to the sector.

2. The method, as recited in claim 1, wherein the n pages are divided into equal sections, and each section is utilized as the extended space of the spare area of each sector in other pages of the NAND Flash, wherein each section has a length equal to a difference between the error correcting code and 16 bytes.

3. The method, as recited in claim 1, wherein the n pages of the block are from page 1 to page n, so that the extended space of the spare area is from page 1-$n$, and the page 1-$n$ are divided into m equal sections, so that normal pages each including a data area and a spare area begin from page n+1, wherein a first sector of the page n+1 is labeled S1, and the extended space of the spare area corresponding to the first sector of the page n+1 is labeled R1, when R1 is the first section of page 1, the first section of page 1 is the extended space of the spare area corresponding to the first sector of the page n+1, and when the n pages are pages other than the page 1-$n$, the correspondence is derived from the above.

4. The method, as recited in claim 3, wherein the NAND Flash, when writing data into the data area of a sector, a page number of the sector where the extended space locates is read into an internal memory RAM, wherein the extended space is corresponding to the spare area of the sector.

5. The method, as recited in claim 1, wherein the NAND Flash addresses by logical address of the data area when writing data into the data area.

6. The method, as recited in claim 1, wherein in the NAND Flash, when writing data into the data area of a sector, a page number of the sector where the extended space locates is read into an internal memory RAM, wherein the extended space is corresponding to the spare area of the sector.

7. The method, as recited in claim 1, wherein when reading data, in the NAND Flash, data in the data area, error correcting code in the spare area and error correcting code in the extended space corresponding to the spare area must be read firstly, and then decoded with a decoder.

8. The method, as recited in claim 7, wherein in the NAND Flash, reading data comprises steps of:
reading a page number Pn from the RAM; and
decoding 512 bytes data in the data area of each sector corresponding to the page number $P_n$, 16 bytes error correcting code in the spare area of each sector corresponding to the page number $P_n$, and error correcting code in the extended space $R_n$ corresponding to the spare area of the sector with the decoder, so as to obtain the data stored.

* * * * *